United States Patent [19]

Reedy

[11] Patent Number: 5,707,571

[45] Date of Patent: Jan. 13, 1998

[54] PROCESS FOR PRODUCING FIBER REINFORCED FOAM HAVING A RANDOM ORIENTATIONS OF FIBERS

[76] Inventor: Michael Edward Reedy, 42 First St., Keyport, N.J. 07735

[21] Appl. No.: 662,903

[22] Filed: Jun. 12, 1996

Related U.S. Application Data

[63] Continuation of Ser. No. 289,632, Aug. 12, 1994, abandoned, which is a continuation of Ser. No. 676,276, Mar. 28, 1991, abandoned.

[51] Int. Cl.[6] ............................................. B29D 7/00
[52] U.S. Cl. ................................... 264/45.3; 264/51
[58] Field of Search ............................ 264/45.3, 51

[56] References Cited

U.S. PATENT DOCUMENTS 3,474,050 10/1969 Chappelear et al. .
4,828,897 5/1989 Staneluis et al. .......................... 428/71
4,940,629 7/1990 Weber et al. ........................... 428/213
5,200,261 4/1993 Taguchi et al. ........................ 428/245

OTHER PUBLICATIONS

Kenrich Petrochemicals, Inc., partial product brochure, pp. 8, 10, 12, 14, 16, 18, 20, 22, add: 29 and add: 41 (undated).

*Primary Examiner*—Richard Weisberger
*Attorney, Agent, or Firm*—Philip E. Roux; Rogers & Wells

[57] ABSTRACT

A fiber reinforced, thermoplastic foam is produced by dispersing fibers of controlled dimensions and blowing agent in molten thermoplastic and extruding the mixture with high back pressures. As the blowing agent expands, the fibers become randomly oriented and a fine cellular structure is formed in the plastic which freezes the fibers in a random spatial orientation. The resulting reinforced foam may be used as formed or compacted to collapse the foam and then shaped.

25 Claims, No Drawings

PROCESS FOR PRODUCING FIBER REINFORCED FOAM HAVING A RANDOM ORIENTATIONS OF FIBERS

This is a continuation of application Ser. No. 08/289,632, filed Aug. 12, 1994, now abandoned which is a continuation of application Ser. No. 07/676,276, filed Mar. 28, 1991, now abandoned.

FIELD OF THE INVENTION

The present invention relates to a fiber reinforced thermoplastic foam and its process of manufacture.

DESCRIPTION OF RELATED TECHNOLOGY

Foamed thermoplastics are conventionally made by passing thermoplastic chips, powder, pellets through a heated screw extruder and out through a die or nozzle. A foaming agent such as a volatile chemical or pressurized gas is mixed into the molten plastic upstream of the die or nozzle. The die pressure is accordingly sufficient to resist expansion of the foaming agent inside the extruder. Once outside the extruder, however, these foaming agents rapidly expand and introduce a cellular structure to the plastic. Such a structure increases the rigidity and strength of the extruded plastic.

The art has recognized that fibers have the ability to further reinforce an extruded plastic body. The methods used to combine the fibers with the plastic have, however, varied. One method is to inject the plastic, such as a polyurethane, into a mold containing a mat of fibers. See, U.S. Pat. No. 4,568,603. Another combination method is to mix the fibers with an unfoamed plastic such as polystyrene, extrude and cut the mixture into rods, steep the rods in methylene chloride, mix the steeped rods with a mixture of pentane and acetone, extrude the mixture, and allow the polystyrene to foam: See, U.S. Pat. No. 3,474,048. U.S. Pat. No. 3,256,218 adds fiber or particulate fillers to a polyurethane foam.

The prior methods have gone to great lengths to avoid the problems associated with extruding a fiber-containing plastic mass. Among the problems associated with such an extrusion is an unacceptable level of fiber orientation due to the directional shear through the barrel and die plate. Oriented fibers result in a material having differing strengths depending on whether force is applied in the direction parallel or perpendicular to the fibers. It would be desireable to have a foamed thermoplastic that contained reinforcing fibers with sufficient randomness that the resulting material would exhibit uniform strength characteristics, i.e. not anisotropic.

One process involves the formation of polyamide fibers from molten aramid material in the extruder. The Chappelear et al. patents (U.S. Pat. No. 3,474,048 and U.S. Pat. No. 3,474,050) describe processes for extruding thermoplastic foams that have been reinforced with fibers. The '048 patents describes th e process with glass and asbestos fibers. A silane "sizing agent" is used to enhance the adhesion between the fibers and the foamed plastic. The '50 patent is directed to polyamide, polyester and polycarbonate fibers formed in situ (the fiber material melts in the extruder but is oriented into a fiber, i.e., drawn, from the extrusion forces).

The process technique common to both the '048 and '050 patents is the addition of a reinforcing agent to the thermoplastic in the extruder. Each patent cites to a number of different ways to add the foaming agent. One method specifically referred to is in U.S. Pat. No. 3,160,688. See, col 5 in line 56 of the '048 patent and col 7 in line 16 of the '050 patent.

Aykanian U.S. Pat. No. 3,160,688 describes a process for foamed thermoplastics by adding the foaming agent to the molten thermoplastic in the mixing zone of the extruder (injectors 34). The examples are operated at a die temperature of 390° F., a back pressure of 2500 psi and a die pressure of 1500 psi. The foaming agent can be dichlorodifluoromethane (FREON 12) per col. 3, line 74. The formation of reinforcing fibers in the extruder from molten polyamide, however, does not allow meaningful control over the dimensions or uniformity of the resulting fibers. The requirement for melting in the extruder also limits the fiber materials that can be used as reinforcing.

It would be useful to have a foamed plastic material and process for its manufacture for using fibers having controllable dimensions.

It would also be useful to have a foamed plastic product and a process for its manufacture that would not be limited to fibers that melt in the extruder.

SUMMARY OF THE INVENTION

It is an object of the invention to provide a foamed thermoplastic product and a process for its manufacture that results in a random fiber spatial orientation within the foamed product.

It is another object of the invention to provide a foamed thermoplastic product and a process for its manufacture that permits the use of fibers having controlled dimensions and/or fiber materials that do not melt and lose dimensional integrity in the extruder.

It is another object of the invention to provide a solid, reinforced thermoplastic product which maintains the random fiber spatial orientation of the foamed, reinforced thermoplastic.

In accordance with these and other objects which will become apparent from the description herein, the process of the invention comprises:

mixing a molten thermoplastic, a blowing agent, and a plurality of discrete fibers each being coated with a coupling agent and exhibiting a length within the range from about 0.5 mm to about 25 mm to form a molten, reinforced, unfoamed plastic;, and extruding said molten, reinforced, unfoamed plastic at conditions sufficient to allow said blowing agent to expand to induce a foamed structure in said thermoplastic.

In another aspect of the invention, the product comprises:
a thermoplastic and
a plurality of expanded, discrete fibers coated with a coupling agent and exhibiting a length within the range from about 0.5 mm to about 25 mm, said fibers being dispersed and randomly oriented within said thermoplastic.

The process and product of the invention make available a one-step method for dispersing fibers in a foamed thermoplastic without fiber orientation or anisotropy in the final product. The result is a material having a high degree of structural integrity and rigidity yet easily formed into a variety of shapes.

DETAILED DESCRIPTION

The present invention relates to a process for introducing fibers into extruded thermoplastics to form a fiber-reinforced, foamed thermoplastic. The resulting product can be formed into sheets, composites, or other such articles having applications which require light materials with good strength and rigidity.

Fibers useful in the present invention are formed outside the extruder so the fiber properties can be adequately controlled for reproducible structural qualities. The fiber materials useful in the present process and for the present product include aramids, polybenzimidazole, cellulosic, polyester, phenolic, carbon, glass, polyimides, polyamides. The fibers should have a length between about 0.5 mm to about 25 mm, preferably substantially all or 100% of the fibers have a length of less than about 10 mm, most preferably less than about 5 mm in length, with an average fiber diameter of about 1–20 μm. The fiber content of reinforced plastics according to the invention are within the range from about 0.5 wt % to about 60 wt % based on the entire composite weight.

The most preferred fiber material is an expanded aramid fiber commercially available from American Fibers & Abrasives, Inc. of Bangor, Mich. under the name Aramid 26DA. These expanded fibers are aramid fibers available in their unexpanded form under the trademark KEVLAR® (copolymer of p-phenylenediamine and terephthalic acid). Expanded aramid fibers are made by exposing the unexpanded fibers to high speed, high shear blending, ball milling, or hammer milling which cause the fibers to expand in volume without significantly reducing the length of the fiber. While not wishing to be found by theory, it is thought that the high shear conditions break the intrafiber bonds and cause the fibers to expand. The expansion is visible in the product because the unexpanded fibers exhibit the appearance of shiny, parallel threads, but the expanded fibers look soft and fuzzy. For such expanded fibers, the fiber diameters referred to above are with respect to the after expansion.

The expanded fibers also have a higher surface area than unexpanded fibers, e.g. greater than about 75% and preferably about 100% or greater surface area. This expanded surface area is used to great advantage for increasing the bond strength between the thermoplastic by vacuum impregnating the expanded aramid fibers with about 0.25 wt % to about 0.75 wt % on fiber of at least one coupling agent slurried with a suitable solvent. Suitable solvents are readily determinable by those in this art with no more than routine experimentation or review of existing reference manuals. Preferred solvents include a mixture of 1-ethenyl-2-pyrrolidinone, xylene, and toluene.

Coupling agents act as molecular bridges between the reinforcing fibers (dispersed phase) and the bulk thermoplastic (dispensing phase). Preferably, the coupling agent used is d a type that is activated, i.e. forms the bridging bonds, by the heat inside the extruder. The activated coupling agent enhances the bond between the fibers and the thermoplastic.

Suitable coupling agents include organic titanates such as those described in U.S. patent application Ser. No. 609,727 (filed May 14, 1984); U.S. Pat. No. 4,069,192; U.S. 4,080,353; U.S. Pat. No. 4,087,402; U.S. Pat. No. 4,094,853; U.S. Pat. No. 4,096,110; U.S. Pat. No. 4,098,758; U.S. Pat. No. 4,122,062; U.S. Pat. No. 4,152,311; U.S. Pat. No. 4,192,792; U.S. Pat. No. 4,101,810; U.S. Pat. No. 4,261,913; U.S. Pat. No. 4,277,415; U.S. Pat. No. 4,338,220; and U.S. Pat. No. 4,417,009 (which are herein incorporated by reference), zirconates, aluminates, and silanes. Such coupling agents are also described in JP59-164,309; ZA 82/07,567; JP60-39,712; ES 511,708; U.S. Pat. No. 4,525,494; JP60-71,625; JP60-86,129; and the KEN-REACT™ Reference Manual (Bulletin No. KR-1084L-4) from Kenrich Petrochemicals, Inc. of Bayonne, N.J. That reference manual is herein incorporated by reference.

In particular, the following is a list of suitable coupling agents for use in the present invention with the accompanying trademark under which these materials are available from Kenrich Petrochemicals: KEN-REACT™ NZ 37 (zirconium IV di-neoalkanolato di(para-amino benzoato-O); KEN-REACT™ NZ 38 (zirconium IV neoalkanolato, tri (dioctyl) pyrophosphate-O); KEN-REACT™ LICA 38 (neopentyl(dially)oxy, tri(dioctyl)pyro-phosphato titanate; KEN-REACT™ KZTPP (cyclo[dineopentyl(dially)] pyrophosphato dineopentyl-(idally) zirconate; KEN-REACT™ CAPRO L 38/H™ (2,2(bis-2-propenolatomethyl) butanolato, tri(dioctytpyrophosphato) titanate; amino functional silanes such as (N-(2-aminoethyl)-3-aminopropyltrimethoxy silane) or gamma-amino propyltrimethoxy silane; amino-ethyl silanes such as p-aminophenytrimethoxy silane; poly(amino aryl silanes) such as poly(p-aminophenyltrimethoxy silane); poly(alkyl aryl silanes) such as tolyltrimethoxy silane; carboalkoxy-containing silanes Such as mercaptopropyltrimethoxy silane; and haloalkylalkoxy silanes such as chloropropyltrimethoxy silane where the alkyl groups are linear aliphatic groups of up to about 6 carbon atoms, the aryl groups have one or two rings of 6–8 carbons each, and the halo groups are chloro and bromo. The preferred coupling agents are the KEN-REACT™ NZ 37 and KEN-REACT™ LICA 38.

Thermoplastics that will benefit from dispersing fibers according to the invention include:

polyetherimides like ULTEM™ from GE Plastics;

acetals like Thermofil Inc. G1-9900-0215 or Akzo Chemie Inc. AC-80/TF/10;

acrylics like Continental Poly CP-41 or Ayro Industries ACRYLITE PLUS™ H-16;

cellulosics like Eastman Chemicals Products TENITE™ 350 H2;

fluoroplastics (including polytetrafluoroethylene, fluorinated ethylene propylene like Daikin's NEOFLON™, perfluoroalkoxy, polychlorotrifluoroethylene like KEL-F™ from Minnesota Mining and Manufacturing, ethylene-chorotrifluoroethylene copolymer like HALAR™ from Ausimont USA, ethylene-tetrafluoroethylene copolymers like TEFZEL™ from du Pont de Nemours & Co., polyvinylidene fluoride, polyvinyl fluoride, and poly(aryl ether ketone);

nitral resins;

polyamide-imides such as nylon;

polyarylates;

polycarbonates such as LEXAN™;

polyesters;

polyetherimides;

polyolefins such as polyethylene (including high; low, ultra low, very low density varieties), ultra high molecular weight polyethylene, branched polyethylene, polypropylene, polypropylene homopolymer, polypropylene impact copolymers, polypropylene random copolymers, and polybutylene;

polyolefin terephthalates such as polybutylene terephthalate, and polyethylene terephthalate;

ethylene acid copolymers;

ethylene-ethyl acrylates;

ethylene-methyl acrylates;

ethylene-vinyl acetates;

ethylene-vinyl alcohol copolymers;

polyphenylene oxides;

polyphenylene sulfides;

terpolymers of acrylonitrile such as acrylic-styrene-acrylonitrile;

styrene-based plastics including polystyrene, styrene-acrylonitrile, olefin-modified styrene-acrylonitrile, styrene-butadiene copolymers, and styrene-maleic anhydride;

polyarysulfones;

polyethersulfones;

polysulfones;

thermoplastic elastomers;

engineering thermoplastic elastomers;

olefinic thermoplastic elastomers;

polyurethane based styrenic thermoplastic elastomers; and vinyl-based resins such as polyvinyl chloride, and vinylidene chloride. Preferred thermoplastics for use in the present invention are polyolefins, polyamides, styrene-based plastics, acrylonitrile-butadiene-styrene, polyfenylene oxide, and polyesters A particularly preferred thermoplastic that benefits from aramid fiber reinforcement according to the invention is a polyetherimide commercially available under thetrademark ULTEMP™.

One or more foaming agents are added to the molten thermoplastic in the extruder immediately upstream of the extruder nozzle or die. Foaming agents assist in the formation of bubbles within a matrix. Suitable foaming agents for the present invention include chemical foaming agents such as 0.5–1.8 wt % of SAFOAM™ (the sodium salt of polycarboxylic acid and a carbonate) and azodicarbonamide compounds; azodicarbonamide that has been modified with zinc to avoid plate-out; p,p-oxybis (benzenesulfonylhydrizide); p-toluene sulfonyl semocarbazode; 5-phenyltetrazole;n,n dinitrosopentamethylene) and physical foaming agents such as any of the fluorocarbons, e.g., FREON 11 and FREON 12; the linear and iso-$C_4$–$C_5$ hydrocarbons namely butane, isobutane, pentane, and iso-pentane;nitrogen; and carbon 0.3 to about 8 wt % based on the thermoplastic.

The foaming agent expands in random directions upon exiting from the pressures in the extruder which causes the dispensed fibers to become random in orientation as well as induce a cellular structure in the thermoplastic. The randomness of the expanding materials move the fibers out of the inherent orientation induced by the directional shear forces of extrusion. Such randomness eliminates the directional strength found in materials having oriented reinforcing fibers.

The expanding foaming agent also acts as an internal cooling agent for the molten plastic. As a result, the foaming agent cools the extruding mass which translates directly into an increasing viscosity for the extruding mass. The increased viscosity dissipates much of the substantial forces inflicted on the extruding mass due to the high extrusion pressures. By varying the type and amount of blowing agent or blowing agents added to the extruder, the rate and degree of cooling can be controlled which affords control aver the direction and force of the extruded material.

If desired, one or more nucleating agents can be added for additional control over the size and distribution of the cellular structure formed in the plastic. Preferably, the nucleating agent is endothermic to further assist in the cooling of the extruded thermoplastic. Suitable nucleating agents include talc within the range from about 0.1 to about 1.5% wt % and a commercially available chemical endothermic nucleating agent SAFOAM™ within the range from about 0.1 to about 1 wt %.

Preferred nucleating agents are talc; HYDROCEROL™ (sodium bicarbonate and a citric add); a mono-, di- or triglyceride encapsulatated sodium salt of a polycarboxylic acid and sodium bicarbonate; or about 0.1–1 wt % of SAFOAM™ (an agent manufactured by Balchem Corporation of Slate Hill, N.Y. and commercially available from Reedy International Corporation). For the present invention, the SAFOAM™ material can serve as either the foaming agent or as the nucleating agent when used in the appropriate amounts.

Extruders useful in the present invention are of substantially conventional structure. A preferred extruder is a horizontal tandem extruder having a 32:1 screw ratio with at least one mixing section. Conventional spider dies may be used to decrease the degree of orientation that would normally occur in the thermoplastic as it is subjected to passage through the extrusion nozzle or die. The foaming action that will occur upon exit from the spider die will further disorient the fibers dispersed in the plastic.

In operation, a heated screw extruder is fed with thermoplastic in pellet form, expanded fibers vacuum impregnated with coupling agent, any chemical blowing agents, and any nucleating agents. Heat applied from outside the extruder and from the friction forces inside the extruder cause the thermoplastic to melt and the coupling agents to become activated for enhancing the bond strength between the expanded fibers and the thermoplastic. As the molten mixture approaches the nozzle or die at the end of the extruder, a physical blowing agent is injected into the mixture through an appropriate port in the extruder housing.

The pressure inside the axeruder should be maintained at a sufficiently high pressure to prevent premature expansion of the blowing agent or agents. Such pressures will be on the order of about 1200 to about 4500 psi across the exit with external pressures at atmospheric or vacuum pressures although the exact pressure in the extruder will depend on the particular components used.

The molten thermoplastic mixture is passed out of the extruderr through a nozzle or die with the optional use of at least one spider die into a closed or open mold. Preferably, the mixture is extruded into an open form for the manufacture of flat sheet stock or extruded as one layer in a flat sheet composite.

Flat sheet materials according to the invention may be transformed into a solid sheet stock by removing the cellular structure from the reinforced foam without materially altering the random spatial orientation of the fibers in the thermoplastic. The foam structure can be removed by passing the stock into a vacuum chamber or between at least one pair of parallel rollers. It is intended that these compression steps be conducted while the foam is relatively molten but without inducing directional shear forces on the thermoplastic which would cause the move toward a more orderly state. As such, the use of a vacuum chamber has certain advantages from the viewpoint of avoiding directional shear. Such chambers can be prohibitively expensive however, for many sheet sizes. The use of at least one pair of parallel rollers can be used to physically force the gas from within the cell structure and form a solid sheet. With either a vacuum chamber or roller, the result is a sheet stock material of high structural strength that can be thermoformed or compression molded into a variety of shapes.

I claim:

1. A process for making a fiber-reinforced thermoplastic, said process comprising the steps of:

mixing a thermoplastic, a foaming agent, and a plurality of discrete expanded reinforcing fibers coated with a coupling agent which enhances bonding between said thermoplastic and the fibers and bonding between the fibers, each fiber exhibiting a length within the range from about 0.5 mm to about 25 mm in an extruder under conditions including: (a) sufficient heat and friction within said extruder to melt said thermoplastic and activate said coupling agent; and (b) a pressure sufficiently high to prevent premature expansion of said foaming agent, to form a molten, reinforced, unfoamed plastic;

extruding said molten, reinforced, unfoamed plastic to atmospheric or lower pressure to form an extrudate wherein said fibers have an inherent orientation in said molten plastic induced by the directional shear forces of extrusion as said molten plastic exits the extruder; and allowing said foaming agent to expand at atmospheric or lower pressure to induce a cellular structure exhibiting a random orientation of fibers in said thermoplastic wherein said random orientation of fibers is maintained during expansion by the activation of said coupling agent.

2. A process according to claim 1, further comprising removing the cellular structure from the reinforced foamed structure without materially altering the random orientation of the fibers.

3. A process according to claim 2, wherein removing the cellular structure from the reinforced foamed structure is performed by passing the foamed structure into a vacuum chamber or between at least one pair of parallel rollers.

4. A process according to claim 2, wherein removing the cellular structure from the reinforced foamed structure is performed while the foamed structure is relatively molten.

5. A process according to claim 1, wherein the pressure inside the extruder is maintained within the range of from about 1200 to about 4500 psi.

6. A process according to claim 1, wherein the expanded reinforcing fibers comprise aramid fibers coated with a coupling agent selected from the group consisting of titanates, zirconates, amino-functional silanes, and aluminates.

7. A process according to claim 1, wherein the expanded fibers have lengths of less than 10 mm.

8. A process according to claim 1, wherein the thermoplastic is selected from the group consisting of polyolefins and polystyrenes, and the expanded reinforcing fibers comprise aramid fibers.

9. A process according to claim 1, wherein the expanded fibers have lengths of less than 5 mm.

10. A process according to claim 1, wherein the expanded fibers have an average fiber diameter of from about 1 to about 20 microns.

11. A process according to claim 1, wherein the expanded fibers are present in an amount to yield a foamed structure containing from about 0.5 wt. % to about 60 wt. % of fibers.

12. A process according to claim 1, wherein the expanded fibers have a surface area about 75% greater than the surface area of the unexpanded fibers.

13. A process according to claim 1, wherein the expanded fibers have a surface area about 100% greater than the surface area of the expanded fibers.

14. A process according to claim 1, wherein the expanded fibers have a surface area more than 100% greater than the surface area of the unexpanded fibers.

15. A process according to claim 1, wherein the coupling agent is coated on the expanded fibers in an amount of from about 0.25 wt. % to about 0.75 wt. %.

16. A process according to claim 1, wherein the thermoplastic is comprised of a polyetherimide.

17. A process according to claim 1, wherein the foaming agent comprises a chemical foaming agent.

18. A process according to claim 17, wherein the chemical foaming agent is selected from the group consisting of: azodicarbonamide compounds; zinc-modified azodicarbonamide; p,p-oxybis(benzenesulfonylhydrizide); p-toluene sulfonyl semocarbazode; 5-phenyltetrazole; n,n-dinitrosopentamathylene; and a mixture of a sodium salt of a polycarboxylic acid and a carbonate.

19. A process according to claim 18, wherein the foaming agent is used in an amount of from about 0.3 wt. % to about 8 wt. % based on the weight of the thermoplastic.

20. A process according to claim 18, wherein the foaming agent is used in an amount of from about 0.5 wt. % to about 1.8 wt. % based on the weight of the thermoplastic.

21. A process according to claim 1, wherein the foaming agent is a physical foaming agent.

22. A process according to claim 21, wherein the physical foaming agent is selected from a group consisting of: fluorocarbons; linear $C_4$–$C_5$ hydrocarbons; iso-$C_4$–$C_5$ hydrocarbons; nitrogen; and carbon dioxide.

23. A process according to claim 1, wherein the mixture of thermoplastic, foaming agents and expanded fibers further comprises one or more nucleating agents.

24. A process according to claim 23, wherein the nucleating agent is endothermic.

25. A process according to claim 23, wherein the nucleating agent is selected from the group consisting of: talc; a mixture of sodium bicarbonate and citric acid; and a mono-, di-, or triglyceride encapsulated mixture of a sodium salt of a polycarbycylic acid and sodium bicarbonate.

* * * * *